United States Patent Office 3,397,148
Patented Aug. 13, 1968

3,397,148
STABLE SOLVENT COMPOSITIONS
George N. Grammer and Percy W. Trotter, Baton Rouge, La., assignors to Ethyl Corporation, New York, N.Y., a corporation of Virginia
No Drawing. Continuation-in-part of application Ser. No. 444,447, Mar. 31, 1965, which is a division of application Ser. No. 99,068, Mar. 29, 1961. This application Aug. 9, 1966, Ser. No. 571,169
5 Claims. (Cl. 252—171)

ABSTRACT OF THE DISCLOSURE 1,1,1-trichloroethane stabilized against metal corrosion with dioxolane and an epoxide.

---

This application is a continuation-in-part of application Ser. No. 444,447, filed Mar. 31, 1965, now abandoned, which application is a division of application Ser. No. 99,068, filed Mar. 29, 1961, and now issued as U.S. Patent No. 3,238,137.

This invention relates to chlorinated solvents, and particularly to new and highly effective stabilized solvent compositions composed of chlorinated hydrocarbons containing mixtures of stabilizing additives, said compositions being particularly suitable for the liquid and vapor phase degreasing of metals.

Chlorinated aliphatic hydrocarbons are useful as solvents for the degreasing of metals, for dry cleaning and for many other purposes. Such solvents are particularly useful in the degreasing of metals because of their new low flammability and high solvency for oils and greases. Among the most widely used of these solvents are carbon tetrachloride, ethylene dichloride, trichloroethylene and perchloroethylene. Unfortunately, however, chlorinated aliphatic hydrocarbons in general attack and cause corrosion of metallic surfaces upon contact therewith. Such attacks, which also decompose the chlorinated aliphatic hydrocarbon, occur with surprising rapidity, especially at elevated temperatures.

A highly desirable chlorinated hydrocarbon is methyl chloroform, or 1,1,1-trichloroethane, which is known to have exceptionally good solvency powers and other highly desirable properties, particularly for metal cleaning operations. Unfortunately, however, this particular solvent also exhibits an aggravated tendency to decompose and concurrently attack metals, both at ambient or storage temperature conditions as well as at elevated temperatures suitable for cleaning operations.

While some stabilizing additives provide a degree of protection against decomposition of the chlorinated hydrocarbon solvents or against attack upon the metals themselves in liquid and vapor phase, most additives do not provide sufficient protection for commercial use. Thus, even where a successful stabilizing additive has been found for a particular chlorinated hydrocarbon solvent, the stabilized composition still may not meet the rigorous requirements of commercial applications. A commercially acceptable stabilizing additive, or stabilizing system of additives, for example, must be capable of at least stabilizing the solvent system and of inhibiting against metal induced decomposition of the chlorinated hydrocarbon solvent under an array of plant conditions. In one important situation, wherein the solvent is exposed to iron under hydrolytic conditions, often a stabilizer, otherwise acceptable commercially, fails to meet this stringent requirement because when a very small amount of water is introduced into the system, accidentally or otherwise, severe corrosion of the metal and decomposition of the solvent result. Also, a stabilizing additive, otherwise acceptable, is often rejected by the trade because it adds color to the chlorinated hydrocarbon solvent, or its unavailability or excessive cost is another factor which can influence the commercial acceptance of stabilizers.

Insofar as stabilizing 1,1,1-trichloroethane, methyl chloroform, is concerned, the problems are especially acute. From the standpoint of metal induced decomposition, 1,1,1-trichloroethane departs drastically from the norm of other chlorinated hydrocarbon solvents. For example, metals, especially aluminum, will last for days or weeks without being attacked by ordinary chlorinated hydrocarbon solvents, but in the presence of 1,1,1-trichloroethane, aluminum is attacked vigorously and the 1,1,1-trichloroethane solvent is reduced to a blackened or charred mass within minutes. Further, as contrasted with the availability of stabilizers for ordinary chlorinated hydrocarbon solvents, only a few stabilizers are known which are reasonably effective in inhibiting 1,1,1-trichloroethane against such attack, and why these few stabilizers are effective is not known. The mere fact however that a stabilizer will inhibit decomposition of some chlorinated hydrocarbons does not mean that it will stabilize 1,1,1-trichloroethane.

The problem of stabilizing 1,1,1-trichloroethane in the vapor phase is especially acute because even a stabilizer which is useful for stabilization in the liquid phase is useful for stabilizing the vapor phase unless it has sufficient volatility to stabilize the vapor phase, and yet it cannot have such volatility as to deplete unduly the liquid phase.

It was heretofore discovered that dioxolane compounds when used alone are highly effective stabilizers for 1,1,1-trichloroethane. It has now been discovered that the inhibiting power of the dioxolane compound can be even further enhanced by the use of particular epoxide compounds. That these dioxolane compounds with epoxides are capable of such inhibition is unexpected particularly inasmuch as epoxides themselves are poor stabilizers for 1,1,1-trichloroethane. Thus, while the discovery of these dioxolane compounds as inhibitors for 1,1,1-trichloroethane has been of outstanding importance, dioxolane-1,1,1-trichloroethane systems nevertheless do have at least one shortcoming. The dioxolane - 1,1,1 - trichloroethane compositions leave something to be desired when hydrolytic conditions occur and these compositions are in contact with iron, particularly certain forms of iron under extended hydrolytic conditions. Iron in contact with dioxolane-1,1,1-trichloroethane compositions undergoes significant corrosion when hydrolytic conditions occur; however, corrosion of iron under hydrolytic conditions is reduced considerably and significantly pursuant to the present invention which utilizes dioxolane-epoxide combinations of additives with 1,1,1-trichloroethane.

Certain tricomponent stabilizing additives for 1,1,1-trichloroethane consisting essentially of dioxolane, epoxide and mono-olefin compounds have been proposed as exemplified in U.S. Patent 3,099,694; however, even these three component systems, while being a major step forward in the art, are not completely satisfactory for both liquid and vapor stabilization of 1,1,1-trichloroethane and for the prevention of corrosion during the degreasing of metals such as iron with 1,1,1-trichloroethane.

An object of this invention is thus to provide stabilized compositions which are highly effective for degreasing aluminum, iron and other metals. A particular object is to provide 1,1,1-trichloroethane solvent compositions which retain which chemical passivity during repeated cycles of exposure to metals at processing conditions, and against the degradation influences of moisture, elevated temperature, contact with various metals and metal halides, and light. Another object is to provide compositions especially suitable for the vapor phase degreasing of aluminum, iron and other metals. A further object is to provide additive compositions especially adapted for use in 1,1,1-trichloroethane as stabilizers therefor.

These and other objects are achieved according to the present invention by the provision of a stable 1,1,1-trichloroethane solvent composition comprising 1,1,1-trichloroethane having dissolved therein a novel stabilizing mixture of additives in a quantity sufficient to inhibit the 1,1,1-trichloroethane against decomposition. The stabilizing mixture is a substantially monoolefin free mixture consisting essentially of a dioxolane and an epoxide compound. On the basis of outstanding effectiveness and low cost the preferred class of substantially mono-olefin free stabilizer additives are those wherein the dioxolane compound is a 1,3-dioxolane compound containing up to two alkyl substituents, each having from one to two carbon atoms, and the epoxide is a compound containing from about three to about four carbon atoms and having up to one chlorine atom. These mixtures of stabilizing additives added to 1,1,1-trichloroethane form compositions having superb properties particularly in their ability to resist decomposition in the presence of iron under severe hydrolytic conditions even in the vapor phase.

In yet another especially preferred embodiment of this invention the dioxolane and epoxide compounds are blended together to form a substantially mono-olefin free bicomponent mixture of additive concentrates or corrosion inhibitor compositions. These compositions form homogeneous and essentially colorless solutions which can be rapidly and conveniently added to 1,1,1-trichloroethane in all desired proportions. The inhibited 1,1,1-trichloroethane compositions thus formed are highly resistant both to decomposition of the solvent and to corrosion of the metal with which the solvents are placed in contact. In particular, these substantially mono-olefin free additive concentrates when blended with 1,1,1-trichloroethane form highly useful compositions for degreasing the surfaces of metals.

Another preferred embodiment of this invention is that of degreasing a metal by contacting the surfaces of the metal with 1,1,1-trichloroethane while maintaining substantially mono-olefin free bicomponent mixtures of dioxolane and epoxide compounds dissolved within the 1,1,1-trichloroethane in sufficient quantity to inhibit the 1,1,1-trichloroethane against decomposition.

In accordance with the practice of this invention, when a substantially mono-olefin free mixture of stabilizing additives is employed in 1,1,1-trichloroethane there is provided an additive concentrate composed of a mixture of from about 10 percent to about 95 percent by weight of a dioxolane compound, and the balance of the additive concentrate consists essentially of an epoxide compound. A particularly preferred bicomponent corrosion inhibitor composition is one compound of about 50 to about 95 weight percent of a dioxolane compound, and from about 5 to about 50 weight percent of an epoxide compound. This composition is preferred particularly because it provides especially high stabilizing benefits for 1,1,1-trichloroethane under general commercial degreasing conditions and is also available at low cost.

These additives concentrates, or inhibiting compositions consisting essentially of substantially mono-olefin free mixtures of dioxolane and epoxide compounds when added to chlorinated hydrocarbon solvents, even in very minor quantities, form highly stable solvent compositions which are highly beneficial for liquid and vapor degreasing of metals in general, especially iron, copper, aluminum, zinc, as well as their allows. Not only is the dioxolane component of the inhibiting compositions beneficial as a stabilizer, but surprisingly, the substantially monoolefin free dioxolane-epoxide stabilizer pair of compounds produces far greater benefits than can be attributed to the use of dioxolane alone or the predicted cumulative beneficial effects of a mixture of a dioxolane and an epoxide and in certain applications, produces beneficial results exceeding those obtained using a tricomponent stabilizer system consisting essentially of dioxolane, epoxide and mono-olefin. In other words, a multifold benefit beyond that which would be expected or predicted is obtained by the novel stabilizing mixtures.

An especially highly preferred stabilized composition of this type is 1,1,1-trichloroethane containing an inhibiting amount of a mono-olefin free stabilizing mixture consisting essentially of 1,3-dioxolane and epichlorohydrin. The sum total weight of the mixture of corrosion inhibitor compositions used in any given chlorinated hydrocarbon solvent should be between from about 0.3 and about 12 weight percent of the solvent composition employed. Good results may be obtained when from about 2 to about 5 percent by weight of bicomponent mixtures of the stabilizers are present in the chlorinated hydrocarbon solvent. Preferably, a weight concentration of the stabilizing mixture of components is from about 3 to about 4 percent of the weight of the solvent employed.

The following representative experimental data will serve toward a more complete understanding of the present invention. All parts are in weight units except as otherwise specified.

Example I

To each of two closed glass flasks (see Table I below) was added 1 mol of 1,1,1-trichloroethane composition stabilized with 1,3-dioxolane and a sufficient quantity of water to form a 0.5 volume percent mixture of water in 1,1,1-trichloroethane. In the contents of one of these flasks. Flask 2, was then dissolved a sufficient quantity of epichlorohydrin to form a 0.8 weight percent solution of epichlorohydrin in 1,1,1-trichloroethane. Tared strips or iron were then totally immersed within the contents of each of the two flasks. Each of the flasks was then sealed and placed in an oven, heated and maintained at a temperature of 100° C. for a period of 17 hours. At the end of this time, the flasks were removed from the oven, unsealed and the tared strips of iron removed, dried, and reweighed.

The tabulated data of Table I below shows the weight percent loss of iron which was found upon reweighing of each of the iron metal.

TABLE I

| Flask No. | Stabilizing Additive or Additives | Weight Percent Loss of Iron |
|---|---|---|
| 1 | 1,3-dioxolane | 5.0 |
| 2 | 1,3-dioxolane plus epichlorohydrin | 1.0 |

Thus, it is seen by the foregoing data in Table I that the epoxide compound coacts with the dioxolane compound to provide an improvement of 5-fold over the use of dioxolane alone for stabilization of 1,1,1-trichloroethane.

The following Table II shows various bicomponent systems of highly preferred additive concentrates con-

TABLE II

| Ex. | Dioxolane Compound | Epoxide Compound |
|---|---|---|
| II | 10 percent 1,3-dioxolane | 90 percent 1-chloro-2,3-epoxybutane. |
| III | 20 percent 2-methyl-1,3-dioxolane | 80 percent 1-chloro-3,4-epoxybutane. |
| IV | 30 percent 2-ethyl-1,3-dioxolane | 70 percent 1-chloro-3, 4-epoxybutane. |
| V | 40 percent 2-methyl-2-ethyl-1,3-dioxolane | 60 percent 2-chloro-3,4-epoxybutane. |
| VI | 50 percent 2,2-dimethyl-1,3-dioxolne | 50 percent 1-chloro-3,4-epoxybutane. |
| VII | 60 percent 2,2-diethyl-1,3-dioxolaa | 40 percent 1-chloro-2,3-epoxybutane. |
| VIII | 70 percent 4-methyl-1,3-dioxolanne | 30 percent 2-chloro-3,4-epoxybutane. |
| IX | 80 percent 5-ethyl-1,3-dioxolanee | 20 percent epihydrin. |
| X | 90 percent 1,3-dioxolane | 10 percent 1,3-epoxypropane. |
| XI | 95 percent 1,3-dioxolane | 5 percent 3,4-epoxybutane. | sisting of dioxolane and epoxide compounds. These systems of additive concentrates also provide superior and significant results in stabilization of 1,1,1-trichloroethane, particularly in the presence of iron under hydrolytic conditions.

The corrosion inhibitor compositions of Examples II through XI, Table II, are added to 1,1,1-trichloroethane in sufficient quantity to form 0.3, 0.5, 1, 2, 4, 5, 6, 10, and 12 weight percent compositions of the stabilizing mixtures in 1,1,1-trichloroethane. Example I is then repeated with each of these compositions. As in Example I, the solvent compositions show little or no signs of decomposition and the metals are not significantly attacked.

The corrosion inhibitor compositions of Examples II through XI are added to 1,1,2-trichloroethane, carbon tetrachloride, ethylene dichloride, 1,1,2-trichloroethylene, and perchloroethylene, respectively, in sufficient quantities to form 0.3, 0.5, 1, 2, 4, 5, 10 and 12 weight percent compositions of the stabilizing mixtures in each of the respective hydrocarbon solvents. The procedure described in Example I is then again repeated with each of these compositions. In each instance, the solvent compositions show little or no signs of decomposition and the metals are essentially unattacked.

Example XII

Stabilized solutions of 1,1,1-trichloroethane were prepared using mixtures (A) 2.8% dioxolane and 1% epichlorohydrin and (B) 2.8% dioxolane, 1% epichlorohydrin and 2% diisobutylene as the stabilizing additives. A suitable volume, 50–100 ml., of 1,1,1-trichloroethane stabilized with each mixture (A) and (B) above was placed in a Florence flask fitted with a Soxhlet extractor. Rods of polished iron about six inches long were placed in the Soxhlet cup of each flask and the flasks were heated to boil the solvent containing the additive mixture. In this manner the polished iron rods were alternately exposed to refluxing vapor and to condensed liquid during each siphoning cycle. At the end of 60 hours, the iron rods were repolished using the same polishing technique and the loss in weight of each was noted. The results of the test are shown in Table III below.

TABLE III

| Run number | Stabilizing Additive | Percent Corrosion [1] |
|---|---|---|
| 1 | 2.8% dioxolane, 1% epichlorohydrin | 62 |
| 2 | 2.8% dioxolane, 1% epichlorohydrin, 2% diisobutylene | 106 |

[1] Actual units are percent corrosion of iron specimen in 60 hours×10³.

As can be seen from the above Table III, the stabilizing additive of this invention consisting essentially of a mono-olefin free mixture of dioxolane and epoxide compounds is in some instances even superior to three component additive systems known in the art.

As indicated above, stabilized liquid compositions of the present invention show little or no tendency to attack metals even at boiling conditions. The stabilized liquid can be stored for considerable periods of time, usually for months, in contact with aluminum, iron, copper, zinc, and various other metals, or alloys thereof, without significant decomposition. Also, vapors evolved from many of the stabilized liquid compositions show no tendency to attack metals. This makes many of the present solvent compositions highly effective for vapor phase degreasing operations.

For vapor degreasing applications, it is essential that the 1,1,1-trichloroethane composition be not only stable in the liquid state but also that it be susceptible to vaporizing and condensing with full retention of stability. This can be accomplished if an inhibitor has sufficient volatility to be carried into the vapor space in sufficient quantities to stabilize the latter without unduly depleting the liquid phase. In the instant case, the stabilizer compositions described herein provide excellent vapor phase inhibitors from the standpoint of volatility because the concentration of the additives in the vapor phase is very high in relation to their concentration in the liquid phase over a considerable concentration range and in fact beyond the concentration thereof in a chlorinated hydrocarbon solvent necessary for effective stabilization. The volatility of the stabilizing additives is not so great, however, as to be exhausted from the 1,1,1-trichloroethane system too rapidly, and therefore the stable solvent compositions may be used through many cycles without the necessity of adding fresh supplies of additives.

As was stated, a wide variety of dioxolane and epoxide compounds are suitable for the practice of this invention. Preferred dioxolane compounds are the 1,3-dioxolane containing up to two alkyl substituents each having from one to two carbon atoms, and the preferred epoxide compounds are those containing from about three to about four carbon atoms and having up to one chlorine atom.

Nonlimiting examples of the highly preferred dioxolane compounds suitable to the practice of this invention include 1,3-dioxolane,
2-methyl-1,3-dioxolane,
4-methyl-1,3-dioxolane,
5-methyl-1,3-dioxolane,
2-ethyl-1,3-dioxolane,
4-ethyl-1,3-dioxolane,
5-ethyl-1,3-dioxolane,
2,2-dimethyl-1,3-dioxolane,
4,4-dimethyl-1,3-dioxolane,
5,5-dimethyl-1,3-dioxolane,
2,4-dimethyl-1,3-dioxolane,
2,5-dimethyl-1,3-dioxolane,
2,2-diethyl-1,3-dioxolane,
4,4-diethyl-1,3-dioxolane,
5,5-diethyl-1,3-dioxolane,
2,4-diethyl-1,3-dioxolane,
2,5-diethyl-1,3-dioxolane,
2-methyl-2-ethyl-1,3-dioxolane,
2-methyl-4-ethyl-1,3-dioxolane,
2-methyl-5-ethyl-1,3-dioxolane,
2-ethyl-4-methyl-1,3-dioxolane,
2-ethyl-5-methyl-1,3-dioxolane and the like.

Nonlimiting examples of epoxides are such epoxides as epichlorohydrin,
2-chloro-3,4-epoxybutane,
1-chloro-2,3-epoxybutane,
1-chloro-2,4-epoxybutane,
1-chloro-3,4-epoxybutane,
2-chloro-3,4-epoxybutane,
1-chloro-2,4-epoxybutane,
epihydrin,
1,3-epoxypropane,
3,4-epoxybutane,
1,3-epoxybutane,
1,4-epoxybutane,
2,3-epoxybutane, and the like.

For vapor degreasing the most preferred of the dioxolane and epoxide compounds are those boiling within a range of from about 50° C. to about 120° C. and preferably from about 65° C. to about 85° C.

It will be understood that certain minor modifications may be made in the invention without departing from the spirit and scope thereof. For example, it will be understood that the term "metal" as used in this specification includes all metals less active in the presence of chlorinated hydrocarbon solvents than aluminum, iron, copper, zinc, and alloys of these metals since the corrosion inhibitor compositions employed pursuant to the practice of this invention protect against these extremely active metals. They will therefore afford even greater protection against corrosion by 1,1,1-trichloroethane against less active metals. Further, since these corrosion inhibitor compositions will protect 1,1,1-trichloroethane against metal induced decomposition, they will protect ordinary chlorinated hydrocarbon solvents which are not as difficult to stabilize against metal induced decomposition as 1,1,1-trichloroethane. In addition, while specific ranges of additive concentrates—viz., from about 0.3 to about 12 weight percent—can be added to effectively stabilize chlorinated hydrocarbon solvents, amounts below and above this range of concentrations may be employed to provide some stabilizing benefits, and therefore all that is essential within the spirit and scope of the appended claims is that these additive concentrates be present in sufficient quantity to inhibit the 1,1,1-trichloroethane against metal induced decomposition.

Further, the use of mono-olefin free as used in this description is intended to be limiting only to the presence of mono-olefins and not to other compositions or compounds which may be present or beneficial.

Having described the invention what is claimed is:

1. A solvent composition consisting essential of 1,1,1-trichloroethane and from about 0.3 to about 12 weight percent of a mono-olefin free mixture consisting essentially of from about 10 to about 95 weight percent of a dioxolane compound and the balance consisting essentially of an epoxide compound dissolved therein, sufficient to inhibit the 1,1,1-trichloroethane against decomposition, said dioxolane compound being a 1,3-dioxolane compound containing up to 2 alkyl substituents each having from 1 to 2 carbon atoms, and said epoxide being a compound containing from about 3 to about 4 carbon atoms and up to 1 chlorine atom.

2. The composition of claim 1 further characterized by said dioxolane compound being 1,3-dioxolane.

3. The composition of claim 1 further characterized by said epoxide compound being epichlorohydrin.

4. The composition of claim 1 further characterized by said dioxolane compound being 1,3-dioxolane and said epoxide compound being epichlorohydrin.

5. In a degreasing process wherein 1,1,1-trichloroethane is in contact with a metal, the improvement comprising maintaining from about 0.3 to about 12 weight percent of a mono-olefin free mixture consisting essentially of from about 10 to about 95 weight percent of a dioxolane compound and the balance consisting essentially of an epoxide compound dissolved within 1,1,1-trichloroethane sufficient to inhibit the 1,1,1-trichloroethane against decomposition, said dioxolane compound being a 1,3-dioxolane compound containing up to 2 alkyl substituents each having from 1 to 2 carbon atoms, and said epoxide being a compound containing from about 3 to about 4 carbon atoms and up to 1 chlorine atom.

References Cited
UNITED STATES PATENTS

| | | | |
|---|---|---|---|
| 3,113,154 | 12/1963 | Trotter | 252—171 |
| 3,238,137 | 3/1966 | Grammer et al. | 252—171 |

LEON D. ROSDOL, *Primary Examiner.*

W. E. SCHULZ, *Assistant Examiner.*